United States Patent [19]

Tozer

[11] 3,768,007

[45] Oct. 23, 1973

[54] TAPPED DELAY LINE PHASE DISCRIMINATOR

[75] Inventor: Timothy Conrad Tozer, Salfords, near Redhill, England

[73] Assignee: U.S. Philips Corporation, New York, N.Y.

[22] Filed: July 19, 1972

[21] Appl. No.: 273,346

[30] Foreign Application Priority Data

Aug. 3, 1971  Great Britain ................... 36,390/71

[52] U.S. Cl. .................................. 324/84, 324/188
[51] Int. Cl. .......................... G01r 25/02, G04f 9/00
[58] Field of Search ............................. 324/84, 188

[56] References Cited
UNITED STATES PATENTS
3,113,315   12/1963   Preikschat ....................... 324/84 X Primary Examiner—Alfred E. Smith
Attorney—Frank R. Trifari

[57] ABSTRACT

A phase discriminator comprises a transmission line which is tapped by four detectors connected respectively to four points spaced along the line at regular intervals of $\lambda/8$. The line is tapped by a fifth detector connected to a point on the line separated from one of those four points by $\lambda/16$, $\lambda$ being the wavelength of two signals fed to respective ends of the line. This arrangement enables the phase difference to be located within intervals of $\pi/8$ radians. The fifth detector may suitably be situated symmetrically with respect to the first four two further detectors may tap the line at two additional tapping points, one being located $\lambda/32$ from an end tapping-point and the other additional point being $3\lambda/32$ from a penultimate tapping-point: this enables the phase difference to be located within intervals of $\pi/16$ radians.

5 Claims, 7 Drawing Figures

TAPPED DELAY LINE PHASE DISCRIMINATOR

This invention relates to phase discriminators of the type comprising a transmission line tapped by detectors at various points along the line, the two signals whose phases are to be compared being applied one to each end of the line. The term "transmission line" or briefly "line" in this specification includes waveguide.

A known form of phase discriminator comprises a line $3\lambda/8$ long, where $\lambda$ is the wavelength of the signals in the line, tapped by four detector diodes at points spaced along the line at regular intervals of $\lambda/8$. This arrangement enables the phase difference to be located within an interval of $\pi/4$ radians (with a further uncertainty of $n.2\pi$ radians, where $n$ is an integer).

According to the invention a phase discriminator, for comparing the phases of two signals, comprises a transmission line which is tapped by four detectors connected one to each of four points spaced along the line at regular intervals of $\lambda/8$, and which is tapped by a fifth detector connected to a point on the line separated from any one of those four points by an interval of $\lambda/16$, $\lambda$ being the wavelength of the signals in the line. Suitably, the fifth tapping-point is situated symmetrically with respect to the first four tapping-points; in this case, two further detectors may tap the line, one at each point which is $\lambda/32$ from an end tapping-point and $3\lambda/32$ from a penultimate tapping-point. The phase difference may be located within an interval of $\pi/8$ radians with the five-tap line, and within an interval of $\pi/16$ radians with the seven-tap line. The latter degree of accuracy may be obtained with arrangements of seven taps other than that mentioned above. With all arrangements, both five- and seven-tap, there is always a further uncertainty of $n.2\pi$ radians in the phase difference.

In most cases, the transmission line may suitably be $3\lambda/8$ long; this gives the most compact arrangement. Spacings greater than $8\lambda/8$ between the first four tapping-points could be used, but errors due to slightly incorrect positioning of one or more of the tapping-points, or to the signal wavelength not being exactly the design wavelength, would be greater.

The invention will now be more fully described with reference to the accompanying diagrammatic drawings, in which:

FIG. 1 shows a transmission line tapped by two detectors;

FIGS. 2(a), 2(b), 2(c), show three forms of a five-tap line according to the invention;

Figure 1:
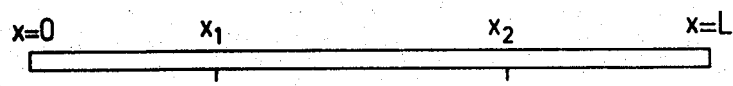
Figure 5:
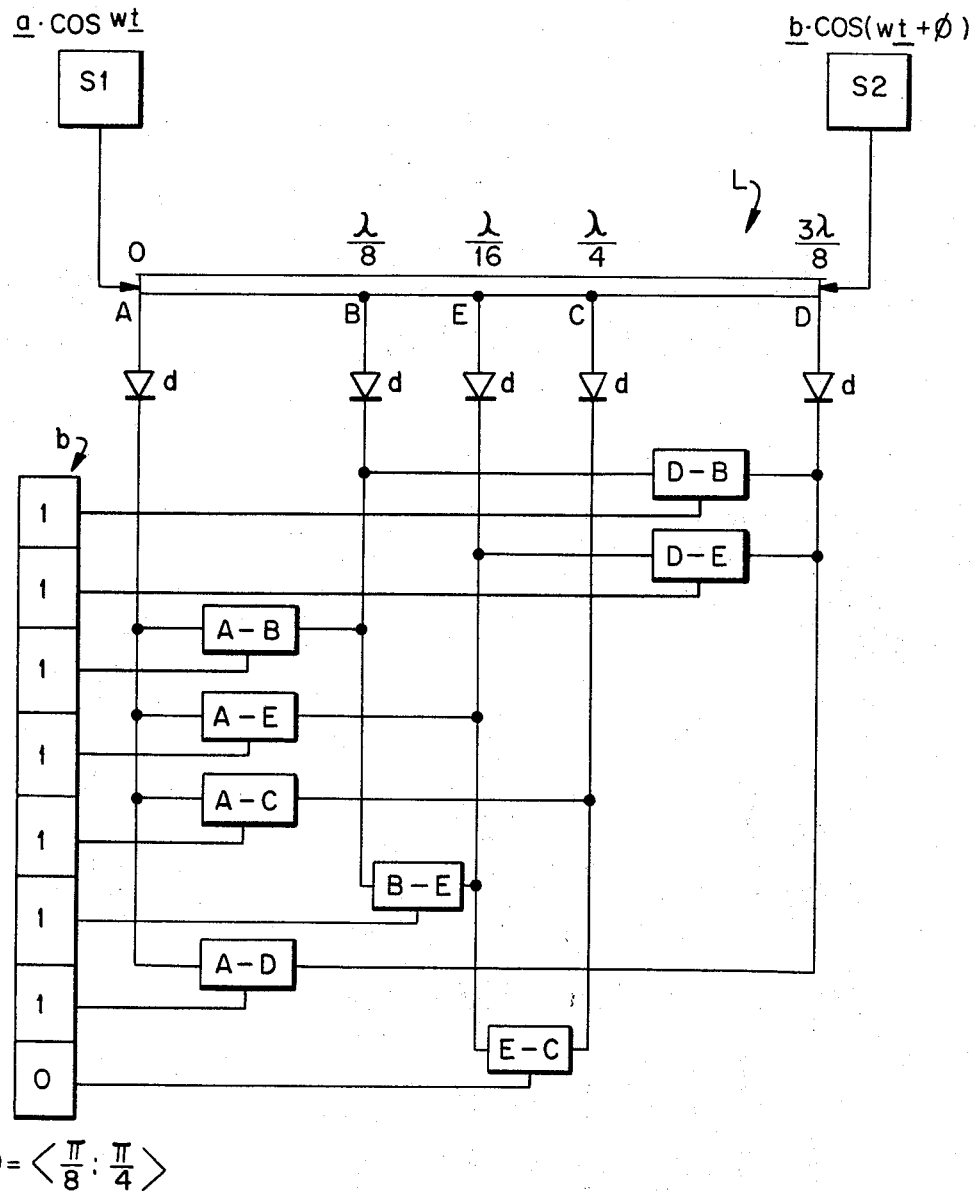
FIG. 5 is a schematical diagram of a phase discriminator employing the line of FIG. 2(a).

Referring to FIG. 5, a line of length L is fed from matched sources S1 and S2 at its left-hand and right-hand ends with signals represented by $a.\cos \omega t$ and $b.\cos (\omega t + \phi)$ respectively; $\omega$ is the angular frequency and $\phi$ is the phase difference between the signals. A standing wave is set up in the line. Referring now to FIG. 1 position along the line is denoted by $x$, the ends of the line being at $x = 0$ and $x = L$, and the propagation constant in the line is $$k = 2\pi/\lambda$$

The output of a square-law detector tapping the line at a point $x$ and assumed not to load the line appreciably is given by $$[a^2 + b^2 + 2ab \cos (\phi - kL + 2kx)]/2$$

The output of such a detector tapping the line at a point $x_2$, subtracted from that of a detector tapping the line at $x_1$, gives the difference output $$2ab \sin k (x_2 - x_1) \sin (\phi - kL + k[x_1 + x_2])$$

The sign of this quantity, with a pair of fixed detectors and signals of constant frequency, varies only with the magnitude of $\phi$, and thus enables $\phi$ to be located within an interval of $\pi$ radians (with the further uncertainty of $n.2\pi$ radians). The sign may be represented by a binary digit, 0 corresponding to $\sin \phi$ being negative and 1 corresponding to $\sin \phi$ being positive.

Figure 2A:
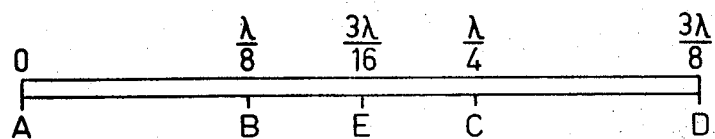
Figure 2B:
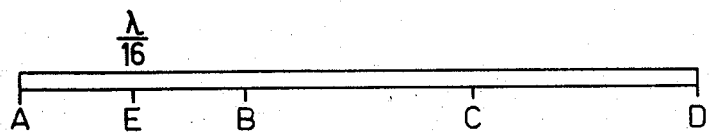
Figure 2C:
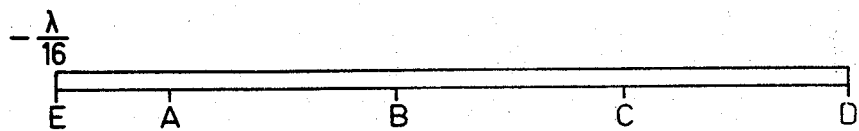

The phase difference may be determined more accurately by obtaining the differences in output between various pairs of detectors connected to a multi-tap line. FIGS. 2(a), 2(b), 2(c), show three forms of five-tap line of length $3\lambda/8$ tapped by four detectors $d$ connected to points A, B, C, D, spaced along the line at regular intervals of $\lambda/8$, and tapped by a fifth detector $d$ connected to a point E separated from one of those four points by $\lambda/16$. (The configuration of FIG. 2(c) requires the line to be extended.) FIG. 5 shows the detectors $d$ and a logic circuitry including subtracting circuits D–B, D–E, A–B, A–E, A–C, B–E, A–D and E–C employed with the configuration 2(a), and the relative amplitudes of the difference outputs are shown in Table 1; for mathematical convenience, the substitution $$\theta = \phi - kL$$
$$= \phi - 3\pi/4$$

has been made.

The difference output signals from the subtracting circuits are fed to a binary logic circuitry $b$ which determines by a binary digit 0 or 1 the sign of each signal, producing an eight-bit Johnson code an analogous arrangement of the logic circuitry of this type has been disclosed in the British Patent Specification No. 1,191,831. This Johnson code is given in Table II, and shows how and thereby $\phi$ may be located within intervals of $\pi/8$ radians. Tables similar to I and II may be drawn up for the configurations 2(b) and 2(c). For the configuration 2(c), $L = 7\lambda/16$ and, therefore, $\phi = -(7\pi/8)$. An embodiment with the symmetrical configuration of FIG. 2(a) may be advantageous in, for example, the layout of components.

Figure 3:
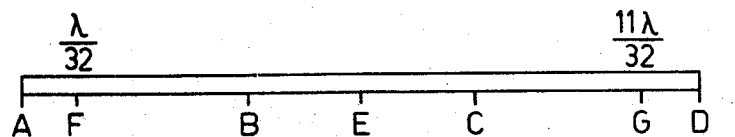
FIG. 3 shows a seven-tap line according to the invention.

FIG. 3 illustrates a further form of discriminator having a total of seven tapping points, enabling $\phi$ to be located within an interval of $\pi/16$ radians. The two additional tapping-points indicated by F and G are situated $\lambda/32$ from an end tapping-point and $3\lambda/32$ from a penultimate tapping-point, namely at $x = \lambda/32$ and $x = 11\lambda/32$ respectively. The detectors employed and the relative amplitudes of the difference outputs are given in Table III.

The arrangement of FIG. 3 is based on the five-tap line of FIG. 2(a). On that basis, other positions for the sixth and seventh taps are possible, but each of the resultant configurations has the disadvantage of requiring the use of one or more difference output signals having a relative amplitude of only $\sin (\pi/16) = 0.195$. This will result in a lack of sensitivity and may produce noise problems in the logic circuitry unless the amplitudes of the original signals applied to the discriminator are sufficiently large. Other arrangements of seven taps may similarly be devised on the basis of the five-tap lines of FIGS. 2(b) and 2(c).

Figure 4:
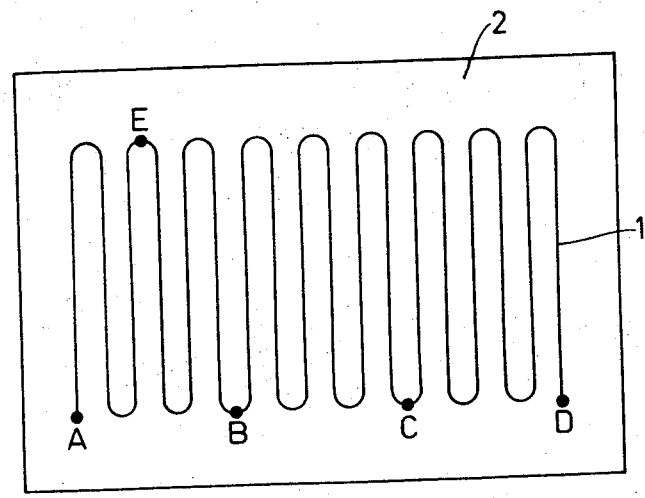
FIG. 4 illustrates an embodiment of the form of FIG. 2(b)

FIG. 4 illustrates a suitable embodiment of a line, tapped at five points indicated by A,B,C,D,E, and arranged as in FIG. 2(b). A strip 1 of copper foil is attached to one surface of a polystyrene sheet 2 completely covered on the opposite surface by a first copperfoil ground-plane. The strip 1 is insulated from a second ground-plane by a dielectric sheet similar to 2, giving a symmetrical disposition. A discriminator of this form was found to operate satisfactorily at 40 MHz.

TABLE I

| Detectors chosen $x_1$ | $x_2$ | Phase-dependent difference output | Relative amplitude of difference output |
|---|---|---|---|
| D | B | $\sin \theta$ | $-\sin(-\pi/2) = 1.000$ |
| D | E | $\sin(\theta + \pi/8)$ | $-\sin(-3\pi/8) = 0.924$ |
| A | B | $\sin(\theta + \pi/4)$ | $\sin(\pi/4) = 0.707$ |
| A | E | $\sin(\theta + 3\pi/8)$ | $\sin(3\pi/8) = 0.924$ |
| A | C | $\sin(\theta + \pi/2)$ | $\sin(\pi/2) = 1.000$ |
| B | E | $\sin(\theta + 5\pi/8)$ | $\sin(3\pi/8) = 0.383$ |
| A | D | $\sin(\theta + 3\pi/4)$ | $\sin(3\pi/4) = 0.707$ |
| E | C | $\sin(\theta + 7\pi/8)$ | $\sin(\pi/8) = 0.383$ |

TABLE II

| $\theta$ | D-B | D-E | A-B | A-E | A-C | B-E | A-D | E-C |
|---|---|---|---|---|---|---|---|---|
| 0 | 1 | 1 | 1 | 1 | 1 | 1 | 1 | 1 |
| $\pi/8$ | 1 | 1 | 1 | 1 | 1 | 1 | 1 | 0 |
| $\pi/4$ | 1 | 1 | 1 | 1 | 1 | 1 | 0 | 0 |
| $3\pi/8$ | 1 | 1 | 1 | 1 | 1 | 0 | 0 | 0 |
| $\pi/2$ | 1 | 1 | 1 | 1 | 0 | 0 | 0 | 0 |
| $5\pi/8$ | 1 | 1 | 1 | 0 | 0 | 0 | 0 | 0 |
| $3\pi/4$ | 1 | 1 | 0 | 0 | 0 | 0 | 0 | 0 |
| $7\pi/8$ | 1 | 0 | 0 | 0 | 0 | 0 | 0 | 0 |
| $\pi$ | 0 | 0 | 0 | 0 | 0 | 0 | 0 | 0 |
| $9\pi/8$ | 0 | 0 | 0 | 0 | 0 | 0 | 0 | 1 |
| $5\pi/4$ | 0 | 0 | 0 | 0 | 0 | 0 | 1 | 1 |
| $11\pi/8$ | 0 | 0 | 0 | 0 | 0 | 1 | 1 | 1 |
| $3\pi/2$ | 0 | 0 | 0 | 0 | 1 | 1 | 1 | 1 |
| $13\pi/8$ | 0 | 0 | 0 | 1 | 1 | 1 | 1 | 1 |
| $7\pi/4$ | 0 | 0 | 1 | 1 | 1 | 1 | 1 | 1 |
| $15\pi/8$ | 0 | 1 | 1 | 1 | 1 | 1 | 1 | 1 |
| $2\pi$ | | | | | | | | |

TABLE III

| Detectors chosen $x_1$ | $x_2$ | Phase-dependent difference output | Relative amplitude of difference output |
|---|---|---|---|
| D | B | $\sin \theta$ | $-\sin(-\pi/2) = 1.000$ |
| G | E | $\sin(\theta + \pi/16)$ | $-\sin(-5\pi/16) = 0.831$ |
| D | E | $\sin(\theta + \pi/8)$ | $-\sin(-3\pi/8) = 0.924$ |
| G | C | $\sin(\theta + 3\pi/16)$ | $-\sin(-3\pi/16) = 0.556$ |
| A | B | $\sin(\theta + \pi/4)$ | $\sin(\pi/4) = 0.707$ |
| F | B | $\sin(\theta + 5\pi/16)$ | $\sin(3\pi/16) = 0.556$ |
| A | E | $\sin(\theta + 3\pi/8)$ | $\sin(3\pi/8) = 0.924$ |
| F | E | $\sin(\theta + 7\pi/16)$ | $\sin(5\pi/16) = 0.831$ |
| A | C | $\sin(\theta + \pi/2)$ | $\sin(\pi/2) = 1.000$ |
| F | C | $\sin(\theta + 9\pi/16)$ | $\sin(7\pi/16) = 0.981$ |
| B | E | $\sin(\theta + 5\pi/8)$ | $\sin(\pi/8) = 0.383$ |
| A | K | $\sin(\theta + 11\pi/16)$ | $\sin(11\pi/16) = 0.981$ |
| A | D | $\sin(\theta + 3\pi/4)$ | $\sin(3\theta/4) = 0.707$ |
| F | D | $\sin(\theta + 13\pi/16)$ | $\sin(11\pi/16) = 0.831$ |
| E | C | $\sin(\theta + 7\pi/8)$ | $\sin(\pi/8) = 0.383$ |
| B | K | $\sin(\theta + 15\pi/16)$ | $\sin(7\pi/16) = 0.981$ |

What is claimed is:

1. A phase discriminator, for comparing the phases of two signals having a wavelength λ,
comprising, in combination,
a transmission line having spaced portions adapted for receiving said signals, respectively,
first four tapping points spaced along the line at regular intervals of λ/8 and arranged between said spaced portions,
a fifth tapping point spaced from at least one of said first four tapping points by an interval of λ/16,
detecting means connected to each tapping point,
and means for providing phase-dependent difference signals forming together a code representative of the measured phase comprising a logic circuitry including
subtraction circuits connected between the outputs of at least eight different pair arrangements of said detecting means.

2. A phase discriminator as claimed in claim 1 wherein said logic circuitry further comprises binary circuits connected to the outputs of said subtraction circuits to display at least an eight-bit binary code representative of a measured phase interval.

3. A phase discriminator according to claim 1 wherein the fifth tapping-point is situated symmetrically with respect to the first four tapping-points.

4. A phase discriminator according to claim 3 and tapped by two further detectors connected one to each point which is λ/32 from an end tapping-point and 3λ/32 from a penultimate tapping-point.

5. A phase discriminator according to claim 1 wherein the transmission line is 3λ/8 long.

* * * * *

PO-1050
(5/69)

UNITED STATES PATENT OFFICE
CERTIFICATE OF CORRECTION

Patent No. 3,768,007  Dated October 23, 1973

Inventor(s) TIMOTHY CONRAD TOZER

It is certified that error appears in the above-identified patent and that said Letters Patent are hereby corrected as shown below:

Column 1, line 39, change "80/8" to -- $\lambda/8$ --.

Figure 5, change " $\dfrac{\lambda}{16}$ " to -- $\dfrac{3\lambda}{16}$ --.

Signed and sealed this 23rd day of April 1974.

(SEAL)
Attest:

EDWARD M. FLETCHER, JR.
Attesting Officer

C. MARSHALL DANN
Commissioner of Patents